United States Patent [19]

Tsuei

[11] Patent Number: 5,783,303
[45] Date of Patent: Jul. 21, 1998

[54] CURABLE WATER-BASED COATING COMPOSITIONS AND CURED PRODUCTS THEREOF

[75] Inventor: Alexander C. Tsuei, Woodbury, Minn.

[73] Assignee: Minnesota Mining and Manufacturing Company, St. Paul, Minn.

[21] Appl. No.: 794,260

[22] Filed: Jan. 31, 1997

Related U.S. Application Data

[62] Division of Ser. No. 598,491, Feb. 8, 1996, Pat. No. 5,643,669.

[51] Int. Cl.$^6$ .................. C09K 3/14; B32B 27/06; C08K 5/06
[52] U.S. Cl. .................. 428/354; 51/298; 524/376; 524/377; 428/483; 428/908.8
[58] Field of Search .................. 524/376, 377; 51/298; 428/323, 328, 329, 355 R, 354, 483, 516, 908.8

[56] References Cited

U.S. PATENT DOCUMENTS

| | | | |
|---|---|---|---|
| 3,578,550 | 5/1971 | Hoerner et al. | 161/162 |
| 4,108,840 | 8/1978 | Friedlander. | |
| 4,278,578 | 7/1981 | Carpenter. | |
| 4,328,274 | 5/1982 | Tarbutton et al. | 428/149 |
| 4,605,690 | 8/1986 | Debroy et al. | 523/414 |
| 4,749,617 | 6/1988 | Canty | 428/332 |
| 4,927,876 | 5/1990 | Coogan et al. | 524/457 |
| 4,939,008 | 7/1990 | Kemski | 428/34.3 |
| 4,981,730 | 1/1991 | Zaleski | 427/393.5 |
| 4,983,716 | 1/1991 | Rao et al. | 528/272 |
| 5,057,371 | 10/1991 | Canty et al. | 428/411.1 |
| 5,071,904 | 12/1991 | Martin et al. | 524/458 |
| 5,196,055 | 3/1993 | Lesney et al. | 106/14.12 |
| 5,243,011 | 9/1993 | Panandiker et al. | 528/45 |
| 5,256,227 | 10/1993 | Roelofs | 156/157 |
| 5,378,252 | 1/1995 | Follensbee | 51/298 |
| 5,435,816 | 7/1995 | Spurgeon et al. | 51/295 |
| 5,643,669 | 7/1997 | Tsuei | 428/354 |

FOREIGN PATENT DOCUMENTS

WO 93/04819  3/1993  WIPO.
WO 94/26468  11/1994  WIPO.

OTHER PUBLICATIONS

"NeoPac R-9699" Data Sheet, Bulletin R-9699, Zeneca Resins, Sep. 1994 (9 pages).
"NOPCO® DSX®-1514 Rheology Modifier" Data Sheet ARC-103A, Henkel Corporation, Dec. 1994 (2 pages).
"Polyfunctional Aziridines" Data Sheet, EIT Inc., undated (7 pages).
"Product Selection Guide for Label Stocks, Laminating Adhesives and Printable Tapes", 3M Identification and Converter Systems Division Brochure, 1991, pp. 14 and 15.
"Silwet® Surfactants" Brochure and Data Sheet, Union Carbide, undated (9 pages).
"Ken-React Lica 38J" Material Safety Data Sheet, Kenrich Petrochemicals, Inc., Feb .11, 1991, 5 pgs.
"Carbon Black Aqualour" Material Safety Data Sheet, Penn Color, Inc., Jul. 29, 1992, 3 pgs.
"Pycal® 94, Plasticizer for Emulsion Adhesives", ICI Surfactants, Wilmington, DE (Oct. 1992), 6 pgs.
"Clear Gloss Metal Lacquer", Zeneca Resins, Oct. 1994, 2 pgs.
"Sancure®" Material Safety Data Sheet, The BFGoodrich Company, Jul. 1994, 4 pgs.

(List continued on next page.)

Primary Examiner—Daniel Zirker
Attorney, Agent, or Firm—Daniel R. Pastirik

[57] ABSTRACT

A low VOC curable water-based coating composition is provided. The composition includes a urethane/acrylic copolymer having a Tg of greater than about 50° C., a polyoxyethylene aryl ether plasticizer, an alkaline-stable crosslinker, and water, wherein the curable water-based coating composition includes less than about 5 wt-% volatile organic compounds, based on the total weight of the composition.

23 Claims, 1 Drawing Sheet

OTHER PUBLICATIONS

Henkel Corporation Material Safety Data Sheet #3798 "NOPCO DSX-1514", Jan. 5, 1995, 4 pgs.

"Silwet L-7210" Material Safety Data Sheet #02210, Osi Specialities, Inc., Apr. 20, 1994, 8 pgs.

"Pycal® 94" Material Safety Data Sheet, Zeneca Inc., Aug. 7, 1990, 4 pgs.

"NeoTac XR-9621" Bulletin XR-9621, Zeneca Resins, Feb. 1993, 6 pgs.

"Water-Soluble Polymers, Applications" in *Encyclopedia of Polymer Science and Engineering*, 17, 778-779 (1989).

"Film Formation by Coalescence of Polymer Particles" in *Encyclopedia of Polymer Science and Engineering, Supplement Volume*, 58-59 (1989).

CURABLE WATER-BASED COATING COMPOSITIONS AND CURED PRODUCTS THEREOF

This is a division of application Ser. No. 08/598,491 filed Feb. 8, 1996 now U.S. Pat. No. 5,643,669.

FIELD OF THE INVENTION

The present invention provides a curable water-based coating composition. Specifically, the present invention provides a curable water-based urethane/acrylic copolymer coating composition for use as a bond system in antislip products and abrasive articles, for example.

BACKGROUND OF THE INVENTION

Water-based polymer dispersions are finding favor in many markets, not only because they provide performance similar to that obtained from conventional organic solvent-based products, but also because they are leading a worldwide movement toward the use of more environmentally friendly products. Generally, water-based polyurethane dispersions offer a variety of advantages, including ease-of-handling, nonflammability, and low toxicity, as well as premium performance. Thus, they are of interest for use in a wide variety of markets. It would be desirable to use them, for example, as make and/or size coatings for coated abrasive articles and antislip products (often referred to as friction surface sheet materials and nonskid sheet materials).

Typically, polyurethane dispersions are alkaline and stabilized such that the polyurethane particles do not agglomerate and/or settle out of the water. This can be done, for example, by neutralizing dispersed polymer acid moieties, such as pendant carboxylic acid moieties, with a basic compound such as ammonia or an amine, e.g., triethylamine. Coatings prepared from many such dispersions generally require the addition of one or more coalescing agents, typically coalescent solvents or "cosolvents," to allow the formation of a useful film upon drying. Glycol ethers, such as alkyl ethers of ethylene or propylene glycol, have been successfully employed as cosolvents in such applications. However, the use of coalescing organic solvents in water-based systems increases the concentration of undesirable volatile organic compounds (VOCs).

Prior to the present invention, urethane/acrylic copolymers have been used in water-based curable coating compositions, but not without the use of undesirable amounts of a VOC coalescing agent. A "volatile organic compound" or "VOC," as used herein, is an organic compound that has a vapor pressure of at least 0.1 mm Hg at 20° C. Under this definition, ethylene glycol monobutyl ether (available from Union Carbide, Danbury, Conn., under the trade designation butyl "Cellosolve"), diethylene glycol monoethyl ether (available from Union Carbide under the trade designation "Carbitol"), propylene glycol n-butyl ether (available from ARCO Chemicals, Newtown Square, Pa., under the trade designation "Arcosolve" PNB), and dipropylene glycol n-butyl ether (available from ARCO Chemicals, under the trade designation "Arcosolve" DPNB), are considered VOCs. Furthermore, relatively large amounts (e.g., about 20% by weight (wt-%) or greater, based on polymer solids) of such coalescing agents have been typically required for effective film formation. Thus, it would be desirable to develop a coating composition for various applications, including for use as a bond material for the manufacture of abrasive articles and antislip products that contain low levels of VOCs.

SUMMARY OF THE INVENTION

The present invention provides a curable water-based coating composition, the cured coating produced therefrom, and articles including the cured coating such as antislip products and abrasive articles. The curable water-based coating composition includes: a urethane/acrylic copolymer having a Tg of greater than about 50° C.; a polyoxyethylene aryl ether plasticizer; an alkaline-stable crosslinker; and water; wherein the curable water-based coating composition includes less than about 5 wt-% volatile organic compounds, based on the total weight of the composition.

A preferred embodiment of the curable water-based coating composition includes: a urethane/acrylic copolymer having a Tg of greater than about 50° C.; a polyoxyethylene aryl ether plasticizer; a polyfunctional aziridine crosslinker; an associative thickener; a surfactant; and water; wherein the curable water-based coating composition includes less than about 5 wt-% volatile organic compounds, based on the total weight of the composition.

The present invention also provides articles, which can be antislip products or abrasive articles (e.g., coated abrasive products, bonded abrasive products, and nonwoven abrasive products), that include a cured binder prepared from the curable water-based coating composition of the invention. One embodiment of an antislip product may be prepared from a bond system comprising the curable water-based coating composition that includes: a urethane/acrylic copolymer having a Tg of greater than about 50° C.; a polyoxyethylene aryl ether plasticizer; an alkaline-stable crosslinker; and water; wherein the curable water-based coating composition includes less than about 5 wt-% volatile organic compounds, based on the total weight of the composition; and a multitude of frictional particles uniformly distributed therein in an amount which on curing provides a frictional surface.

The antislip products may be a sheet comprised of the cured binder/frictional particle composition in a free-standing sheet-like structure (i.e., a cured coating without a backing sheet), or it may be a coating on a backing, either of which may include on a surface opposite the friction surface a layer of pressure sensitive adhesive. In still another embodiment, the cured coating may have a frictional surface provided by an embossed surface, which may or may not include friction particles.

DETAILED DESCRIPTION OF THE INVENTION

The present invention provides curable water-based coating compositions that include urethane/acrylic copolymers having a glass transition temperature (Tg) of greater than about 50° C. The curable water-based coating compositions of the present invention do not include undesirable amounts of a VOC coalescing agent. Surprisingly, film formation is facilitated by the addition of polyoxyethylene aryl ether plasticizer, which is a nonfugitive (i.e., substantially nonvolatile) plasticizer, which dramatically diminishes organic emissions, particularly during the drying and curing process. Furthermore, such nonfugitive plasticizer is used in a relatively minor amount, preferably, in an amount of no greater than about 10 wt-%, and more preferably, no greater than about 5 wt-%, based on polymer solids.

Thus, curable water-based coating compositions of the present invention do not contain an undesirable amount of VOCs, preferably, they contain less than about 5 wt-%, and preferably less than about 2 wt-%, VOCs, such as coalescing solvents, based on the total weight of the composition (including water). The major VOC in the curable coating compositions of the present invention is typically triethylamine, which is often used to stabilize water-based dispersions of urethane-containing polymers. Other possible VOCs that may be included within the curable coating compositions of the present invention include, for example, dimethylethanol amine, isopropanol, and the like, typically, in small amounts to facilitate processing of the curable coating compositions of the present invention.

The low VOC curable water-based coating compositions of the present invention are aqueous polymer dispersions that can be used as the bond system or binder in antislip products or abrasive articles, or as protective coatings, paints, primers, edge sealers, etc. Preferably, the curable coating compositions of the present invention have a solids content of about 30–70 wt-%, more preferably, about 35–65 wt-%, based on the total weight of the composition (including the water). With a solids content of less than about 30 wt-%, the curable coating composition is generally too thin for most applications to form a useful cured coating, although it may be used in applications that require thin coatings. With a solids content of more than about 70 wt-%, the curable coating composition is generally too viscous to coat with conventional coating systems, although it may be extrusion coated or conventionally packaged for sale as a concentrate for dilution with water prior to use.

The low VOC curable water-based coating compositions of the present invention provide cured coatings that adhere well to a wide variety of materials, such as metals, plastics, etc. They provide not only protective coatings for substrates but good coating binders for holding frictional particles (e.g., minerals) to backing sheets, such as plastic films, in abrasive articles and antislip products, for example, with the process benefits of water-based products.

Preferably, cured coatings prepared from the low VOC curable water-based coating compositions of the present invention are durable, chemically resistant, and abrasion resistant. A durable cured coating preferably exhibits the ability to withstand at least about 4000 cycles on a flex fatigue resistance tester (flexed to 270° per cycle) with a 0.91 kg load, without cracking, and if coated on an aziridine-primed polyester film, without delaminating or losing more than about 5 wt-% frictional particles if they are included therein. A durable coating also preferably possesses a tensile strength when tested on a tensile strength testing device of at least about 530 kg/cm$^2$ at a crosshead speed of 30.5 cm/minute as a cured free-standing coating (i.e., a cured coating without a backing sheet). A chemically resistant cured coating preferably withstands immersion in a variety of inorganic and organic chemicals, such as 1% hydrochloric acid, isopropanol, methyl ethyl ketone, and water, for seven days without discoloration or haziness, delamination from an aziridine-primed polyester film, or loss of more than about 5 wt-% frictional particles if they are included therein. An abrasion resistant cured coating in the absence of frictional particles preferably loses no more than about 200 mg per sample after about 1000 cycles on a Taber Abraser abrasion testing device according to the test described in the examples.

The low VOC curable water-based coating compositions of the present invention include a urethane/acrylic copolymer having a Tg of greater than about 50° C., a polyoxyethylene aryl ether plasticizer, and an alkaline-stable crosslinker. Optional additives include, for example, a thickener and a surfactant. In the absence of coalescing solvents, the urethane/acrylic copolymer dispersion does not typically form a polymer film. That is, the dispersed polymer particles without coalescing solvent do not meld during the drying and curing process. Although a thickener can aid in the formation of a polymer film from a water-based urethane/acrylic copolymer dispersion, such films are typically brittle, possibly due to poor coalescence, while the nonfugitive plasticizer aids in the formation of a coalesced, flexible film, such films tend to have a low tensile strength. For example, although a coating prepared only from a urethane/acrylic copolymer and about 2 wt-% of a polyoxyethylene aryl ether plasticizer, based on the total weight of the dispersion, forms a good film, it typically has a tensile strength of less than about 200 kg/cm$^2$. The addition of an alkaline-stable crosslinker to the curable coating composition typically increases the tensile strength of a cured coating by about 300 kg/cm$^2$, as compared to a cured coating prepared without an alkaline-stable crosslinker.

Suitable urethane/acrylic copolymers (i.e., a polymer containing urethane (—R$^1$NHC(O)OR$^2$—) and acrylic —R$^3$—C(O)OH moieties) for use in the compositions of the present invention are those that are capable of forming stable dispersions in water and have a Tg of greater than about 50° C. Preferably, the urethane/acrylic copolymers are aliphatic urethane/acrylic copolymers with an acid number of about 15–16. Typically, stability is accomplished with the use of a stabilizer such as ammonia or triethylamine, for example, which interacts with the acid groups in the polymer. Urethane/acrylic copolymers having a Tg of greater than about 50° C. are typically nonfilm-forming polymers. As used herein, a "nonfilm-forming" polymer is one that is not capable of forming a film in the absence of a coalescing solvent, even at elevated temperatures. Such nonfilm-forming urethane/acrylic copolymers are commercially available. For example, a particularly preferred nonfilm-forming urethane/acrylic copolymer is a high solids, monomer-free, radiation-curable, water-borne urethane/acrylic copolymer, which is commercially available under the trade designation "NeoPac R-9699" from Zeneca Resins Inc., Wilmington, Mass. This urethane/acrylic copolymer is designed for high performance uses, where hardness, flexibility, UV resistance, chemical resistance, and abrasion resistance are desired. It has an acid number of 15. It is provided as a translucent dispersion containing 40 wt-% solids and having a Brookfield viscosity of 100 centipoise at 25° C. It is supplied with a VOC content of 1.1 wt-%, which results from the incorporation of triethylamine as a stabilizer. Prior to the present invention, it was believed that this material required the addition of a VOC coalescing solvent to form a good film.

The low VOC curable water-based coating compositions of the present invention use a polyoxyethylene aryl ether plasticizer as the coalescing agent for the nonfilm-forming urethane/acrylic copolymers. This nonfugitive plasticizer not only enhances film formation, but contributes to the flexibility of the coating. Because this plasticizer is not a VOC and does not significantly evaporate from the curable coating composition or cured coating, the present invention provides a significant advancement in the urethane/acrylic water-based coating art. Preferably, the plasticizers are polyoxyethylene aryl ether compounds of the general formula

HO—(—CH$_2$—CH$_2$—O—)$_x$—C$_6$H$_5$ wherein x=4–10, more preferably, x=4–6, and most preferably, x=4. Generally, as the chain length increases (i.e., with a larger value of x), the hydrophilicity of these compounds increases, and their performance decreases. For example, a cured coating made from a composition containing a plasticizer of the formula listed above with a value of x greater than 10 will typically exhibit poor flex fatigue resistance. Suitable polyoxyethylene aryl ether plasticizers are commercially available from ICI Americas, Inc., Wilmington, Del., under the trade designations "Pycal 94" (x=4), "Hypermer 1L-2718" (x=6), "Hypermer 1L-2719" (x=8), and "Hypermer 1L-2707" (x=10). These plasticizers typically also function as wetting agents in the compositions of the present invention.

A polyoxyethylene aryl ether plasticizer, or mixture of such plasticizers, is present in the curable coating compositions of the present invention in an amount effective to meld the urethane/acrylic particles during the drydown or curing stage and thereby allow a continuous film to form. Preferably, a polyoxyethylene aryl ether plasticizer, or mixture of such plasticizers, is present in the curable coating compositions of the present invention in an amount of no greater than about 15 wt-%, based on the weight of polymer solids. More preferably, the curable coating compositions include about 1–10 wt-%, most preferably, about 3–6 wt-%, plasticizer, based on the weight of polymer solids. If more than about 15 wt-% of the plasticizer is used in the curable compositions of the present invention, relative to the weight of polymer solids, a tacky cured coating results that is not suitable for the present applications. As used herein, "polymer solids" refers to the weight of solids residue remaining after drydown of the principal polymers used in the composition. The "principal polymers" are those that are capable of crosslinking (e.g. urethane/acrylic copolymers, aliphatic urethanes, acrylic copolymers, and other polymers containing pendant carboxylic acid groups). This does not include adjunct components such as plasticizers, thickeners, and the like. This distinction is well known to one of skill in the art.

A crosslinker is included in the curable coating compositions of the present invention to enhance the tensile strength of the cured coating and improve its chemical resistance, for example. Suitable crosslinkers are those that can be used to crosslink urethane/acrylic copolymers and are stable in aqueous alkaline solutions. Examples of such crosslinkers include, but are not limited to, aziridine derivatives. Preferably, the crosslinker is a polyfunctional aziridine compound, and more preferably, a trifunctional aziridine compound. Suitable polyfunctional aziridines are those commercially available under the trade designations "XAMA-2" (trimethylolpropane-tris-(β-(N-aziridinyl)propionate) of the following formula:

and "XAMA-7" (pentaerythritol-tris-(β-(N-aziridinyl)propionate) of the following formula:

from B.F. Goodrich Chemical Co., Cleveland, Ohio., and "NeoCryl CX-100" from Zeneca Resins, Wilmington, Mass. These crosslinkers are particularly desirable because they also function as adhesion promoters to materials such as polyesters, glass, etc. They are preferably used with polymers containing active hydrogens, such as the urethane/acrylic copolymers described above that contains pendant carboxylic acid groups.

An alkaline-stable crosslinker, or mixture of alkaline-stable crosslinkers, is present in the curable coating compositions of the present invention in an amount effective to provide a durable cured coating. Preferably, an alkaline-stable crosslinker, or mixture of alkaline-stable crosslinkers, is present in an amount effective to provide a cured coating with a tensile strength of at least about 530 kg/cm². More preferably, an alkaline-stable crosslinker is present in the curable coating compositions of the present invention in an amount of about 2–8 wt-%, and more preferably, about 4–6 wt-%, based on the weight of polymer solids.

A thickener may be used in the curable coating compositions of the present invention to increase the viscosity of the dispersions. This is sometimes important to provide coatings that do not sag. Suitable thickeners are those that are compatible with urethane/acrylic dispersions. As used herein, "compatible" means that the component does not cause adverse affects to the curable composition (e.g., precipitation, flocculation, or other separation of the components), or to the cured coating (e.g., disruption of film continuity, phase separation, or loss of adhesion to the backing). Preferred thickeners for use in the curable coating compositions of the present invention are associative thickeners. An "associative" thickener is a polymeric compound having hydrophobic groups that associate with the dispersed polymer particles of the curable coating composition. This association is believed to result in adsorption of the thickener molecule onto the dispersed polymer particles.

A preferred thickener is a polyurethane available under the trade designation "DSX-1514" from Henkel Corp., Kankakee, Ill., as an aqueous dispersion having 40 wt-% solids. It is a high shear and low molecular weight thickener having a Brookfield viscosity of 3000 centipoise at 25° C. It is particularly desirable because it provides a significant increase in viscosity of the coating composition when used in small amounts. For example, when used in an amount of about 0.6 wt-%, based on the total weight of the composition, the Brookfield viscosity of a dispersion of "NeoPac R-9699" urethane/acrylic polymer increases from about 100 centipoise to about 12,000 centipoise at 25° C.

An associative thickener, or mixture of associative thickeners, is present in the curable coating compositions of the present invention in an amount effective to increase the viscosity of the dispersions to provide coatings that do not sag. Preferably, an associative thickener, or mixture of associative thickeners, is present in the curable coating compositions of the present invention in an amount of less than about 1 wt-%, and more preferably, in an amount of about 0.05–0.8 wt-%, based on the total weight of the curable coating composition (including water).

Surfactants may be used in the curable coating compositions of the present invention to reduce foaming and to enhance leveling and wetting. This is important to provide smooth, uniform coatings. A wide variety of surfactants, i.e., surface-active agents, are suitable for use in the curable coating compositions of the present invention. Typically, additives that are suitable for use in water-based systems that perform the functions of a defoamer, leveling agent, and/or wetting agent, for example, are suitable. Suitable surfactants include, but are not limited to, flow control agents, wetting agents, dispersants, adhesion enhancers, defoamers, etc. Preferred surfactants are nonionic or anionic. Examples of preferred surfactants are available under the trade designation "Silwet L-7210" (a nonionic polyalkyleneoxide modified polydimethylsiloxane) from Osi Specialties, Inc., Danbury, Conn., "Surfynol 104PA" (2,4,7,9-tetramethyl-5-decyn-4,7-diol) from Air Products and Chemicals, Inc., Allentown, Pa., and "Triton GR-7M" (an anionic sulfosuccinate) from Union Carbide Chemicals and Plastics Company, Inc., Danbury, Conn.

A surfactant, or mixture of surfactants, is present in the curable coating compositions of the present invention in an amount effective to provide a smooth, uniform coating. Preferably, a surfactant, or mixture of surfactants, is present in the curable coating compositions of the present invention in an amount of about 0.1–3 wt-%, and more preferably, about 0.5–2 wt-%, based on the total weight of the curable coating composition (including water).

The low VOC curable coating compositions of the present invention can include other optional additives such as colorants, flattening agents, UV absorbers, UV scavengers, coupling agents, adhesion promoters, fillers, and the like, that are compatible with water-based systems. Any of these components, as well as any of the components listed above, can be used in various combinations, including two or more of each type of compound, to achieve desired results.

Colorants, such as pigments and dyes, suitable for use in water-based systems are well known in the art and can include, for example, carbon blacks, titanium dioxide, and the like. An example of a carbon black is that available under the trade designation "Carbon Black Aqualour 36B17" from Penn Color, Inc., Doylestown, Pa. Phosphorescent pigments, i.e., compounds that glow in the dark, are particularly desirable colorants. Suitable phosphorescent pigments include, for example, phosphorescent pigment available under the trade designation "Excite 2330LBY" from LJSR OPTONIX Inc., Hackettstown, N.J. A pigment, or mixture of pigments, is typically used in an amount effective to provide the desired color, which is well known to one of skill in the art.

Flattening agents may be used in the curable compositions of the present invention to reduce the reflective characteristics (i.e., gloss) of the cured coating. Suitable flattening agents are those that are compatible with water-based systems. Particularly suitable flattening agents are silica flattening agents, which are available under the trade designations "Lo-Vel 27" and "Lo-Vel 275" (ultrafine amorphous silica) from PPG Industries, Inc., Pittsburgh, Pa. A flattening agent, or mixture of flattening agents, is typically used in an amount effective to provide the desired level of gloss to the cured coating, which is well known to one of skill in the art.

UV scavengers and UV absorbers may be used in the curable compositions of the present invention to enhance UV stability of a cured coating. Suitable UV scavengers and absorbers are those that are compatible with water-based systems. One particularly suitable UV scavenger is available under the trade designation "Tinuvin 123" (a bis(2,2,6,6-tetramethyl-4-piperidinyl)ester of decanedioic acid), which is the reaction product of 1,1-dimethylethylhydroperoxide and octane) from Ciba-Geigy Corporation, Tarrytown, N.Y.

One particularly suitable UV absorber is available under the trade designation "Tinuvin 1130" (a substituted hydroxyphenyl benzotriazole) from Ciba-Geigy Corporation, Tarrytown, N.Y. A UV scavenger or UV absorber, or mixture of such compounds, is typically used in an amount effective to provide the desired UV stability, which is well known to one of skill in the art. Typically, these are added to the coating composition as a premix with the plasticizer to avoid precipitation.

Coupling agents can be used in the curable compositions of the present invention to enhance bonding of any frictional particles, particularly those that are made of a ceramic material, applied to the surface of a coating formed from the coating composition or mixed within the coating composition. Suitable coupling agents are those that are compatible with water-based systems. One particularly suitable coupling agent is a titanate coupling agent available under the trade designation "Lica 38J" (a methylacrylamide functional amine adduct of neopentyl(diallyl)oxy tri(dioctyl)pyrophosphatotitanate) from Kenrich Petrochemicals, Inc., Bayonne, N.J. A coupling agent, or mixture of coupling agents, is typically used in an amount effective to provide the desired adhesion of the frictional particles, which is well known to one of skill in the art.

Many production advantages exist with the use of this water-based coating composition. For example, odor during coating and curing is dramatically diminished, and curing time and temperature are reduced when compared to conventional solvent-based systems. Conventional solvent-based systems may require several hours at about 120° C. for drying and curing. For certain compositions of the present invention, however, temperatures of about 70°–110° C. can be used for less than about one hour, and for other compositions, temperatures of about 20°–30° C. can be used, thereby resulting in significant energy savings. Solvent emissions may be reduced to the point where emission control equipment may not be necessary. Fire and explosion hazards may also be reduced because no organic solvents, such as VOC coalescing solvents, are added to the composition.

An adhesion promoter may be used in the curable coating compositions of the present invention to enhance adhesion of the cured coating to a desired material, such as a backing sheet typically used in abrasive articles and antislip products or other surfaces to which the coating may be applied. A wide variety of adhesion promoters that are compatible with water-based urethane/acrylic polymer systems are suitable for use in the curable coating compositions of the present invention. Suitable adhesion promoters include, but are not limited to, acrylic copolymers and aliphatic polyester urethanes. Preferred adhesion promoters are available under the trade designations "NeoCryl A-633" (an acrylic copolymer available as an aqueous emulsion with 42 wt-% solids, which adheres well to steel and aluminum surfaces as well as engineering plastics such as acrylonitrile/styrene/butadiene, which is available, for example, under the trade designation "Lustran" from Monsanto or "Cycolac" from General Electric Plastics of Parkersburg, W. Va., polystyrene elastomers, which is available, for example, under the trade designation "Styron Foam" from Dow Chemical, and blends of polystyrene and polyphenylene ether, which is available under the trade designation "Noryl" from General Electric Plastics) and "NeoTac XR-9621" (an aliphatic polyester urethane available as an aqueous dispersion with 38 wt-% solids, which adheres well to vinyl, polyester, and low density polyethylene), both of which are from Zeneca Resins Inc., Wilmington, Mass. Acrylic copolymers are particularly desirable because they provide adhesion to a variety of materials, such as those mentioned above, as well as quarry tiles and vinyl composition tiles typically used on flooring surfaces, upon curing the coating composition at room temperature (i.e., 20°–30° C.).

An adhesion promoter, or mixture of adhesion promoters, is present in the curable coating compositions of the present invention in an amount effective to improve adhesion to a desired material. Preferably, aliphatic polyester urethane adhesion promoters, or mixture of such adhesion promoters, are present in the curable coating compositions of the present invention in an amount of about 2–20 wt-%, more preferably, about 2–10 wt-%, and most preferably, about 3–7 wt-%, based on the weight of the urethane/acrylic copolymer solids. Preferably, acrylic copolymer adhesion promoters, or mixture of such adhesion promoters, are present in the curable coating compositions of the present invention in an amount of about 25–145 wt-%, and more preferably, about 60–120 wt-%, based on the weight of the urethane/acrylic copolymer solids.

Once applied to a backing sheet, the time and temperature used in the process of curing a composition of the present invention can impact adhesion of the coating to the backing sheet on which it is coated. Preferably, to obtain a desirable coating, the coating composition is allowed to dry for a short period of time at a relatively low temperature, preferably for about 1–12 minutes at a temperature of less than about 45° C. It is then placed in a preheated oven set at a temperature greater than about 45° C. for less than about five minutes, preferably at a temperature of about 70°–80° C., for about 1–2 minutes. While the coated backing sheet is still in the oven, the temperature of the oven is raised to about 90°–110° C. over a short period of time, preferably over about 2–6 minutes. The oven is then maintained at this temperature for about 15–30 minutes. In this way, water is driven off slowly from the coating composition, thereby preventing the formation of bubbles and cracks. Furthermore, this allows for the formation of a strong bonding interaction with the backing sheet. By comparison, if the curable coating composition is exposed to a high temperature, such as 100° C., without initially slowly driving off the water, cracks can form. If the curable coating composition is exposed to a lower temperature, such as 20°–80° C., for a longer period of time, a uniform coating forms, but it does not typically adhere well to the backing sheet. Thus, to obtain a strong flexible coating that adheres well to backing sheets, it is desirable to slowly drive off the water at a low temperature and then heat the coated backing sheet to a temperature high enough to cure the coating. Alternatively, it has been discovered that acrylic copolymer adhesion promoters, such as that available under the trade designation "NeoCryl A-633" are particularly suitable for providing good adhesion for coatings cured at temperatures of about 20°–80° C., and preferably at about room temperature (i.e., 20°–30° C.).

The curable coating compositions of the present invention can be used as a paint, primer, edge sealer, or as a binder for holding frictional particles to antislip products such as friction surface sheet materials and nonskid or antislip sheet materials. Examples of such materials include, but are not limited to, friction surface sheet materials for use on smooth surfaces such as stair treads, skate boards, boat trailer fenders, diving boards, and surf boards, as well as on rough and irregular surfaces such as grooved metal ladder rungs, curved truck fenders, and curved stair nosing. Such materials are disclosed, for example, in U.S. Pat. Nos. 3,578,550 (Hoerner et al.) and 4,328,274 (Tarbutton et al.). Generally, antislip sheet materials include a backing sheet, frictional particles, and at least one binder to hold the frictional particles on the backing. Preferably, such products include a first layer of a binder material, a layer of frictional particles, and a second layer of a binder material. Typically, the first layer of binder material is referred to as a "make" coating and the second layer of binder material is referred to as a "size" coating. A layer of pressure sensitive adhesive can be coated on the surface of the backing sheet opposite the frictional particles and binder layers.

The curable coating compositions of the present invention can also be used as a binder for holding minerals, for example, to conventional abrasive articles, such as to coated abrasive products (including structured abrasives, lapping films, and the like), and nonwoven abrasive products (including nonwoven abrasive pads), and bonded abrasive products (including grinding wheels, cutoff wheels, and honing stones). Coated abrasive products include a backing sheet, frictional particles (e.g., abrasive grain), and at least one binder to hold the frictional particles on the backing. Preferably, such products include a first layer of a binder material (i.e., the make coating), a layer of frictional particles, and a second layer of a binder material (i.e., the size coating). The coating compositions of the invention are particularly useful in film-backed coated abrasives, such as lapping films, and in coated abrasive articles to be used in lubricated environments or in low pressure and/or low temperature applications. Nonwoven abrasive products typically include an open porous lofty polymer filament structure having abrasive grain distributed throughout the structure and adherently bonded therein by a binder. Bonded abrasives typically include a shaped mass of abrasive grain held together by a binder. In each of these applications, the cured coating compositions of the present invention perform the function of the binder.

Figure 1:
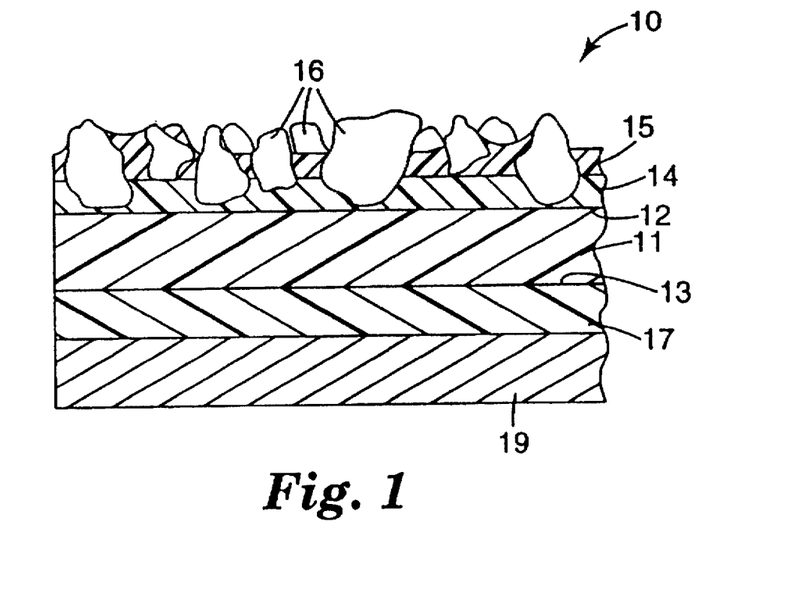
FIG. 1 is an enlarged cross-sectional view of a segment of an antislip sheet material of the present invention, which contains frictional particles.

Referring to FIG. 1, antislip sheet material 10 (which could also be representative of a coated abrasive product) includes backing sheet 11, having upper surface 12 and lower surface 13. First layer 14 of first binder material (the "make" coating) is bonded to upper surface 12. Second layer 15 of second binder material (the "size" coating) overcoats first layer 14. A multitude of frictional particles 16, which is capable of withstanding pedestrian traffic without significant fracture, are uniformly distributed over upper surface 12 of backing sheet 11 and firmly bonded thereto by make coating 14 and size coating 15 so that the tops of frictional particles 16 project above the general plane of the exposed surface of size coating 15 to provide a friction surface. It should be noted that the size coating may cover some of the projecting parts of the frictional particles, because the size coating is applied over the frictional particles in making the sheet material. In that case, the top ends of the frictional particles will project above the plane of the top surface of the size coating with a layer of size coating of varying thickness covering the top ends to provide a protruberance consisting of a size coated abrasive particle. In use, the size coating can wear away to expose the projecting top end of the abrasive particle. The combined thickness of the make and size coatings 14 and 15 is sufficient to bond particles 16 thereto and to substantially resist particle loss under pedestrian use.

An optional layer 17 of pressure sensitive adhesive is coated on lower surface 13 of backing sheet 11 to facilitate attachment of the antislip sheet material (or coated abrasive product) to a substrate surface. Optionally, if the backing sheet, make coating, size coating, and pressure sensitive adhesive are transparent, either bottom surface 13 or top surface 12 of backing sheet 11 can be imprinted to provide a decorative design, message or other indicia to provide decoration as is disclosed in U.S. Pat. No. 4,328,274 (Tarbutton et al.). Preferably, if adhesive layer 17 is used, it is protected by an appropriate release liner 19, which can be formed from sheet material known for this purpose, such as silicone coated kraft paper and the like.

The make and size coatings can be formed from the same curable coating composition. Alternatively, the make and size coatings may be from two different coating compositions. For example, the make coating can include a plasticized acrylate polymer and the size coating can include the composition of the present invention. One skilled in the art will understand the necessity of assuring effective adhesion of the make coating to the backing sheet and any added minerals or fillers, as well as adhesion of the size coating to the same minerals and the make coating itself. If the make coating and size coating include the composition of the present invention, the size coating typically includes a flattening agent and/or colorant as well as a UV scavenger and/or absorber. The coating weight of the make and size coatings will vary depending upon the size of the frictional particles, more binder being permitted with larger particles. The make and size coatings should be of a sufficient thickness to bond the particles, but not so thick as to obscure the particles and thereby diminish or eliminate friction surface. Typical coating weights are about 85–200 grams per square meter for the make coating and about 45–145 grams per square meter for the size coating.

The backing sheet is formed from sheet material known for this purpose, such as cloth, paper, nonwoven webs, polymeric film, fiber, metal sheets, as well as laminates or treated versions thereof. Examples include, but are not limited to, cloth or nonwovens of glass, polyester, polyamide, rayon, cotton, or combinations thereof, polymeric films of polyamide, polyvinyl chloride, polyethylene, polypropylene, or combinations thereof, biaxially oriented films of polyethylene terephthalate and polypropylene, annealed aluminum foil, polymethyl methacrylate and ethylene-methacrylic acid copolymers. Typically, the backing sheet need not have an extremely high degree of strength, although such strength is preferred. The backing sheet should, however, have sufficient strength to permit processing, i.e., coating and handling, and installation upon a substrate, and, if desired, removal from such substrate. The surface of the backing sheet can be primed or otherwise treated to improve adhesion to coatings thereon. Many known surface treatments can be used for this purpose.

A wide variety of frictional particles can be used in making the antislip and abrasive articles of the present invention. Suitable such particles include, but are not limited to, abrasive grain such as silicon carbide, fused aluminum oxide, ceramic aluminum oxide, heat treated aluminum oxide, white aluminum oxide, alumina zirconia, diamond, ceria, cubic boron nitride, garnet, sol-gel derived abrasive grain, and the like, as well as cork, rubber, glass, and polymeric particles made from polyester, urea-formaldehyde, melamine, acrylic, polyalkyl diglycol carbonate, and phenolic resins. The particles can be transparent or opaque. They can be regularly shaped or irregularly shaped, with or without sharp edges (although sharp edges are preferred for abrasive articles). The term "frictional particles" also encompasses single particles that are bonded together to form an agglomerate. The particle size range can vary, depending on the particular use, which is well known to one of skill in the art.

A wide variety of conventional pressure sensitive adhesives can be used. The one selected should have excellent adhesion to the chosen backing sheet. It should also have excellent initial adhesion to ensure adequate adhesion when the antislip material is first placed on a surface. Preferably, it is selected to have a relatively high degree of cohesive strength to prevent splitting, if the antislip sheet material is to be removed from the substrate. Also, for use on irregular surfaces, it should have a relatively low degree of recovery or elastic memory to reduce the possibility of the sheet material pulling away from the irregular surface once it has been adhered.

The antislip and coated abrasive articles of the present invention can be prepared by conventional techniques that are known to one of skill in the art. For example, for antislip sheet materials and coated abrasive products a curable coating composition can be applied to a backing sheet by brushing, roll coating, extrusion coating, curtain coating, spraying, knife coating, and the like. Frictional particles can then be applied to this first layer of binder (i.e., the make coating) by a number of known methods such as the methods known in the abrasive making art. One preferred method of coating the frictional particles on the backing sheet is by drop coating wherein the frictional particles are permitted to fall through the air onto the freshly coated surface of the backing sheet so as to be uniformly distributed across the coated surface. Thereafter, the make coating can be cured, or the size coating can be applied immediately and both coatings cured simultaneously.

The coating compositions of the present invention can also be used in antislip products without the need for a backing sheet. That is, a composition of the present invention can be cured to form a free-standing coating, and a layer of adhesive may be applied to one surface of the free-standing cured coating. Such a free-standing cured coating is typically more conformable than if a backing sheet were used. Such a free-standing cured coating can be embossed (either before or after formation of the coating) or include frictional particles mixed therein. To prepare a free-standing cured coating, the curable coating composition is coated on a nonadherent surface, which can be an embossing tool made of polyethylene or untreated polyester, for example, and cured. A layer of adhesive, which can be on a release liner, is then applied to the cured coating. The release liner, adhesive, and cured coating is then removed from the nonadherent surface as a unitary structure. This free-standing cured coating can then be applied directly to a substrate with the intervening layer of adhesive but no backing sheet.

Figure 2:
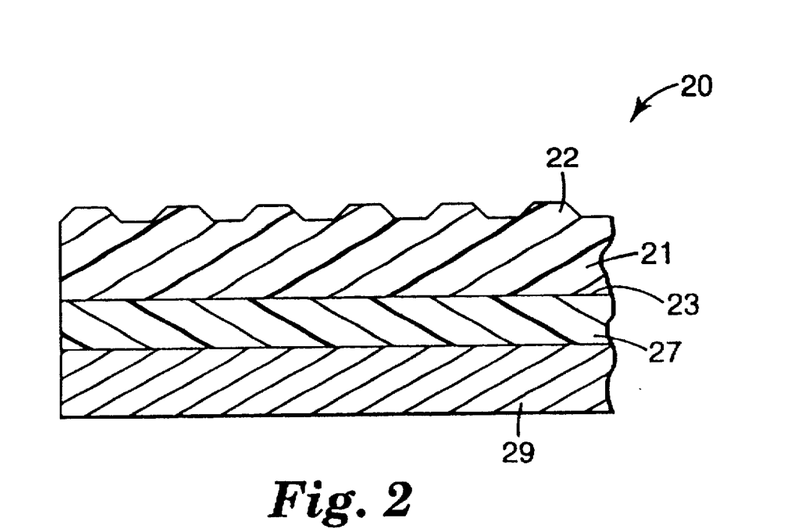
FIG. 2 is an enlarged cross-sectional view of a segment of an alternative antislip sheet material of the present invention, which includes an embossed friction surface.

Referring to FIG. 2, antislip sheet material 20 includes free-standing coating 21, having upper surface 22 and lower surface 23. A layer 27 of pressure sensitive adhesive is coated on lower surface 23 of free-standing coating 21 to facilitate attachment of the antislip sheet material to a substrate surface. Preferably, adhesive layer 27 is protected by appropriate release liner 29, which can be formed from sheet material known for this purpose, such as silicone coated kraft paper and the like.

The following examples are offered to further illustrate the various specific and preferred embodiments and techniques of the present invention. It should be understood, however, that many variations and modifications can be made while remaining within the scope of the present invention.

EXAMPLES

Preparation of Coating Compositions

Each of the coating compositions described in the following examples was prepared by adding in sequence to a suitable container the listed components in the amounts identified. Each addition was followed by mixing with a standard low shear laboratory propeller-type mixer at medium speed for approximately 5–10 minutes or until the component was blended into the mixture. If a crosslinker was added to the mixture, prior to its addition, the composition was mixed for about 1 hour, after which time the crosslinker was added followed by a final mixing of about 5–10 minutes.

Unless otherwise specified, the backing sheet on which the compositions were coated was an aziridine-primed polyester film. Aziridine-primed polyester film was manufactured as described in U.S. Pat. No. 5,057,371 (Canty et al.) using the aziridine treatment solution of U.S. Pat. No. 4,749,617 (Canty), Example 1 modified to include a water-based urethane polymer (as shown in Example 2 of U.S. Pat. No. 4,749,617). Thus, sufficient treatment solution containing 1.8 wt-% water-based urethane polymer, 0.2 wt-% sulfonated polyester polymer, 0.4 wt-% XAMA-7 polyfunctional aziridine, 0.16 wt-% Triton X-100 (Rohm and Haas, Philadelphia, Pa.), and 97.44 wt-% water was applied to polyester film to achieve a dry thickness of 40 nm.

The composition was coated onto the aziridine-primed polyester film, unless otherwise specified, to a wet thickness of about 0.30 mm, and generally to a wet thickness within a range of about 0.20 mm to about 0.38 mm, unless otherwise specified.

Comparative Example A

A coating composition was prepared from 200 grams of "NeoPac R-9699" water-based urethane/acrylic copolymer (40% solids in water), 4.0 grams of "Silwet L-7210" nonionic polyalkylene oxide modified silicone surfactant solution ("Silwet L-7210" surfactant as purchased diluted to 50% in water), and 5.7 grams of "DSX-1514" polyurethane thickener dispersion (prepared by premixing 1.0 gram of "DSX-1514" thickener as purchased and 4.7 grams of 60° C. water). Once coated on the aziridine-primed polyester film, the composition was dried by heating in an oven at 64° C. for 15 minutes. A nonuniform brittle film resulted using a thickener with the urethane/acrylic copolymer in the absence of a plasticizer and a crosslinker.

Comparative Example B

A coating composition was prepared from 200 grams of "NeoPac R-9699" water-based urethane/acrylic copolymer (40% solids in water), and 4.0 grams of "Pycal 94" polyoxyethylene aryl ether plasticizer (HO—(—CH$_2$—CH$_2$—O—)$_4$—C$_6$H$_5$). Once coated on the aziridine-primed polyester film, the composition was dried by heating in an oven at 64° C. for 15 minutes. A uniform but weak coating was formed using only a plasticizer with the urethane/acrylic copolymer.

Comparative Example C

A coating composition was prepared from 200 grams of "NeoPac R-9699" water-based urethane/acrylic copolymer (40% solids in water), and 16.0 grams of "Pycal 94" polyoxyethylene aryl ether plasticizer. Once coated on the aziridine-primed polyester film, the composition was dried by heating in an oven at 64° C. for 15 minutes. This coating was uniform and stronger than that of Comparative Example B and flexible, but it lacked acceptable durability for the proposed uses.

EXAMPLE 1

A coating composition was prepared from 200 grams of "NeoPac R-9699" water-based urethane/acrylic copolymer (40% solids in water), 4.0 grams of "Pycal 94" plasticizer, 4.0 grams of "Silwet L-7210" nonionic surfactant solution ("Silwet L-7210" surfactant as purchased diluted to 50% in water), 7.1 grams of "DSX-1514" polyurethane thickener dispersion (prepared by premixing 1.2 grams of "DSX-1514" thickener as purchased and 5.9 grams of 60° C. water), and 4.0 grams of "XAMA-7" polyfunctional aziridine crosslinker (pentaerythritol-tris-(B-(N-aziridinyl) propionate). Once coated on the aziridine-primed polyester film, the composition was cured by drying it for 20 minutes at 93° C. A durable, flexible coating that adhered well to the backing sheet was formed using a plasticizer, crosslinker, and the urethane/acrylic copolymer.

EXAMPLE 2

A coating composition was prepared from 200 grams of "NeoPac R-9699" water-based urethane/acrylic copolymer (40% solids in water), 4.0 grams of "Hypermer IL-2718" polyoxyethylene aryl ether plasticizer (HO—(—CH$_2$—CH$_2$—O—)$_6$—C$_6$H$_5$), 4.0 grams of "Silwet L-7210" nonionic surfactant solution ("Silwet L-7210" surfactant as purchased diluted to 50% in water), 7.1 grams of "DSX-1514" polyurethane thickener dispersion (prepared by premixing 1.2 grams of "DSX-1514" thickener as purchased and 5.9 grams of 60° C. water), and 4.0 grams of "XAMA-7" polyfunctional aziridine crosslinker. Once coated on the aziridine-primed polyester film, the composition was cured by drying it for 20 minutes at 93° C. A durable, flexible coating that adhered well to the backing sheet was formed.

EXAMPLE 3

A coating composition was prepared from 200 grams of "NeoPac R-9699" water-based urethane/acrylic copolymer (40% solids in water), 4.0 grams of "Hypermer IL-2719" polyoxyethylene aryl ether plasticizer (HO—(—CH$_2$—CH$_2$—O—)$_8$—C$_6$H$_5$), 4.0 grams of "Silwet L-7210" nonionic surfactant solution ("Silwet L-7210" surfactant as purchased diluted to 50% in water), 7.1 grams of "DSX-1514" polyurethane thickener dispersion (prepared by premixing 1.2 grams of "DSX-1514" thickener as purchased and 5.9 grams of 60° C. water), and 4.0 grams of "XAMA-7" polyfunctional aziridine crosslinker. Once coated on the aziridine-primed polyester film, the composition was cured by drying it for 20 minutes at 93° C. A durable, flexible coating that adhered well to the backing sheet was formed.

EXAMPLE 4

A coating composition was prepared from 200 grams of "NeoPac R-9699" water-based urethane/acrylic copolymer (40% solids in water), 4.0 grams of "Hypermer IL-2707" plasticizer (HO—(—CH$_2$—CH$_2$—O—)$_{10}$—C$_6$H$_5$), 4.0 grams of "Silwet L-7210" nonionic surfactant solution ("Silwet L-7210" surfactant as purchased diluted to 50% in water), 7.1 grams of "DSX-1514" polyurethane thickener dispersion (prepared by premixing 1.2 grams of "DSX-1514" thickener as purchased and 5.9 grams of 60° C. water), and 4.0 grams of "XAMA-7" polyfunctional aziridine crosslinker. Once coated on the aziridine-primed polyester film, the composition was cured by drying it for 20 minutes at 93° C. A durable, flexible coating that adhered well to the backing sheet was formed.

EXAMPLE 5

A coating composition was prepared from 200 grams of "NeoPac R-9699" water-based urethane/acrylic copolymer (40% solids in water), 4.0 grams of "Pycal 94" plasticizer, 4.0 grams of "Silwet L-7210" nonionic surfactant solution ("Silwet L-7210" surfactant as purchased diluted to 50% in water), 7.1 grams of "DSX-1514" polyurethane thickener dispersion (prepared by premixing 1.2 grams of "DSX-1514" thickener as purchased and 5.9 grams of 60° C. water), 2.0 grams of "Aqualour 36 B17" carbon black dispersion ("Aqualour 36 B17" carbon black as purchased diluted to 50% solids in water), and 4.0 grams of "XAMA-7" polyfunctional aziridine crosslinker. Once the composition was coated on the aziridine-primed polyester film, sharp abrasive mineral was scattered by hand onto the wet coating in a generally uniform random manner to a weight of abrasive of about 209 g/m². The composition was then cured by drying it for 20 minutes at 93° C. A durable, flexible coating that adhered well to the backing sheet and mineral was formed.

EXAMPLE 6

A coating composition was prepared from 500 grams of "NeoPac R-9699" water-based urethane/acrylic copolymer (40% solids in water), 10.0 grams of "Pycal 94" plasticizer, 10.0 grams of "Silwet L-7210" nonionic surfactant dispersion solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), 1.0 gram "Surfynol 104PA" nonionic surfactant, 10.0 grams of "XAMA-7" polyfunctional aziridine crosslinker. Once coated on the aziridine-primed polyester film, this composition was allowed to stand at room temperature (about 22° C.) for 5 minutes and then heated in an oven at 74° C. for 1 minute. The temperature of the oven was then raised to 102° C. over about 5 minutes, and maintained at this temperature for 20 minutes for further curing of the coating. A durable, flexible coating that adhered well to the backing sheet was formed.

EXAMPLE 7

A coating composition was prepared from 200 grams of "NeoPac R-9699" water-based urethane/acrylic copolymer (40% solids in water), 4.0 grams of "Pycal 94" plasticizer, 4.0 grams of "Silwet L-7210" nonionic surfactant solution ("Silwet L-7210" surfactant as purchased diluted to 50% in water), 7.1 grams of "DSX-1514" polyurethane thickener dispersion (prepared by premixing 1.2 grams of "DSX-1514" thickener as purchased and 5.9 grams of 60° C. water), and 4.0 grams of "XAMA-7" polyfunctional aziridine crosslinker. After coating this composition onto the aziridine-primed polyester film, CarboProp 20/40 ceramic beads from Carbo Ceramics, Inc., New Iberial, La., were scattered by hand onto the wet coating in a generally uniform random manner to a weight of abrasive of about 775 g/m². The composition was cured by drying it for 5 minutes at 66° C. and subsequently for 20 minutes at 93° C. A durable, flexible make coating that adhered well to the backing sheet and mineral was formed.

A second coating composition (i.e., the size coating) was prepared from 200 grams of "NeoPac R-9699" water-based urethane/acrylic copolymer, 4.0 grams of "Pycal 94" plasticizer, 4.0 grams of "Silwet L-7210" nonionic surfactant solution ("Silwet L-7210" surfactant as purchased diluted to 50% in water), 2 grams of "DSX-1514" polyurethane thickener dispersion (prepared by premixing 0.35 gram of "DSX-1514" thickener as purchased and 1.65 grams of 60° C. water), 4.0 grams of "XAMA-7" polyfunctional aziridine crosslinker, and 1 gram of "Lica 38J" coupling agent. This composition was coated on the cured construction having a make coating and ceramic beads and then heated again for 20 minutes at 93° C.

EXAMPLES 8 and 9

A coating composition was prepared from 500 grams of "NeoPac R-9699" water-based urethane/acrylic copolymer (40% solids in water), 10.0 grams of "Pycal 94" plasticizer, 10.0 grams of "Silwet L-7210" nonionic surfactant solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), 7.5 grams of "Lo-Vel 275" ultrafine amorphous silica, 1.0 gram of "Surfynol 104PA" nonionic surfactant, and 10.0 grams of "XAMA-7" polyfunctional aziridine crosslinker. After coating this composition onto the aziridine-primed polyester film, either sharp abrasive mineral as used in Example 5 (Example 8) or carbo prop 20/40 ceramic beads as used in Example 7 (Example 9) were scattered by hand onto the wet coating in a generally uniform random manner to a weight of about 210 g/m² (Example 8) or 775 g/m² (Example 9). The compositions were both cured by drying for 5 minutes at 21° C., then for 1 minute at 74° C., then for 5 minutes while the temperature was increased from 74° C. to 102° C., and finally for 20 minutes at 102° C. Durable, flexible make coatings that adhered well to the backing sheet and mineral were formed.

A second coating composition (i.e., the size coating) was prepared from 500 grams of "NeoPac R-9699" water-based urethane/acrylic copolymer (40% solids in water), 10.0 grams of "Pycal 94" plasticizer, 10.0 grams of "Silwet L-7210" nonionic surfactant solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), 7.5 grams of "Lo-Vel 275" ultrafine amorphous silica, 1.0 gram of "Surfynol 104PA" nonionic surfactant, and 10.0 grams of "XAMA-7" polyfunctional aziridine crosslinker. This composition was coated on the cured constructions with sharp abrasive mineral (Example 8) or the ceramic beads (Example 9) and then cured by heating the composition as described for the make coating.

EXAMPLES 10 and 11

A coating composition was prepared from 475 grams of "NeoPac R-9699" water-based urethane/acrylic copolymer (40% solids in water), 25 grams of "NeoPac R-9621" aliphatic polyester urethane adhesion promoter (38% solids in water), 10.0 grams of "Pycal 94" plasticizer, 10.0 grams of "Silwet L-7210" nonionic surfactant solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), 7.5 grams of "Lo-Vel 275" ultrafine amorphous silica, 1.0 gram of "Surfynol 104PA" nonionic surfactant, and 10.0 grams of "XAMA-7" polyfunctional aziridine crosslinker. After coating this composition onto the aziridine-primed polyester film, either sharp abrasive mineral as used in Example 5 (Example 10) or carbo prop 20/40 ceramic beads as used in Example 7 (Example 11) were scattered by hand onto the wet coating in a generally uniform random manner to a weight of about 210 g/m² (Example 10) or 775 g/m²

(Example 11). The compositions were both cured by drying for 5 minutes at 21° C., then for 1 minute at 74° C., then for 5 minutes while the temperature was increased from 74° C. to 102° C., and finally for 20 minutes at 102° C. Durable, flexible make coatings that adhered well to the backing sheet and mineral were formed.

A second coating composition (i.e., the size coating) was prepared from 475 grams of "NeoPac R-9699" water-based urethane/acrylic copolymer (40% solids in water), 25 grams of "NeoPac R-9621" aliphatic polyester urethane adhesion promoter (38% solids in water), 10.0 grams of "Pycal 94" plasticizer, 10.0 grams of "Silwet L-7210" nonionic surfactant solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), 7.5 grams of "Lo-Vel 275" ultrafine amorphous silica, 1.0 gram of "Surfynol 104PA" nonionic surfactant, and 10.0 grams of "XAMA-7" polyfunctional aziridine crosslinker. This composition was coated on the cured constructions with sharp abrasive mineral (Example 10) or the ceramic beads (Example 11) and then cured by heating the composition as described for the make coating.

EXAMPLE 12

A coating composition was prepared from 475 grams of "NeoPac R-9699" water-based urethane/acrylic copolymer (40% solids in water), 25 grams of "NeoPac R-9621" aliphatic polyester urethane adhesion promoter (38% solids in water), 10.0 grams of "Pycal 94" plasticizer, 10.0 grams of "Silwet L-7210" nonionic surfactant solution ("Silwet L-7210" surfactant as purchased diluted to 50% in water), 3.0 grams of "Triton GR-7M" anionic surfactant, 8.5 grams of "DSX-1514" polyurethane thickener dispersion (prepared by premixing 1.5 grams of "DSX-1514" thickener as purchased and 7.0 grams of 60° C. water), 5.0 grams "Aqualour 36B17" carbon black pigment ("Aqualour 36B17" carbon black as purchased diluted to 50% solids in water), and 10.0 grams of "XAMA-7" polyfunctional aziridine crosslinker. After coating this composition onto the aziridine-primed polyester film, sharp abrasive mineral as used in Example 5 was scattered by hand onto the wet coating in a generally uniform random manner to a weight of about 209 g/m². The coated sample was allowed to stand at room temperature (22° C.) for 5 minutes. It was then heated in an oven at 85° C. for 1 minute. The temperature of the oven was then raised to 102° C. over about 2 minutes, and maintained at this temperature for 5 minutes for further curing of the coating. A durable, flexible make coating that adhered well to the backing sheet and mineral was formed.

A second coating composition (i.e., the size coating) was prepared from 475 grams of "NeoPac R-9699" water-based urethane/acrylic copolymer (40% solids in water), 25 grams of "NeoPac R-9621" aliphatic polyester urethane adhesion promoter (38% solids in water), 10.0 grams of "Pycal 94" plasticizer, 10.0 grams of "Silwet L-7210" nonionic surfactant solution ("Silwet L-7210" surfactant as purchased diluted to 50% in water), 3.0 grams of "Triton GR-7M" anionic surfactant, 2.9 grams of "DSX-1514" polyurethane thickener dispersion (prepared by premixing 0.5 gram of "DSX-1514" thickener as purchased and 2.4 grams of 60° C. water), 10.0 grams "Aqualour 36B17" carbon black pigment ("Aqualour 36 B17" carbon black as purchased diluted to 50% solids in water), and 15.0 grams of "Lo-Vel 275" ultrafine amorphous silica. This composition was coated on the cured construction with sharp abrasive mineral and then cured by heating the composition as described for the make coating.

EXAMPLE 13

A coating composition was prepared from 450 grams of "NeoPac R-9699" water-based urethane/acrylic copolymer (40% solids in water), 50 grams of "NeoPac R-9621" aliphatic polyester urethane adhesion promoter (38% solids in water), 10.0 grams of "Pycal 94" plasticizer, 10.0 grams of "Silwet L-7210" nonionic surfactant solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), and 10.0 grams of "XAMA-7" polyfunctional aziridine crosslinker. After coating this composition onto the aziridine-primed polyester film, it was cured by drying for 20 minutes at 66° C. A durable, flexible make coating that adhered well to the backing sheet and mineral was formed.

EXAMPLE 14

A coating composition was prepared from 475 grams of "NeoPac R-9699" water-based urethane/acrylic copolymer (40% solids in water), 25 grams of "NeoPac R-9621" aliphatic polyester urethane adhesion promoter (38% solids in water), a premixed solution of 10.0 grams of "Pycal 94" plasticizer with 4.0 grams of "Tinuvin 1130" UV absorber and 2.0 grams of "Tinuvin 123" UV scavenger, 10.0 grams of "Silwet L-7210" nonionic surfactant solution ("Silwet L-7210" surfactant as purchased diluted to 50% in water), 3.0 grams of "Triton GR-7M" anionic surfactant, 8.5 grams of "DSX-1514" polyurethane thickener dispersion (prepared by premixing 1.5 grams of "DSX-1514" thickener as purchased and 7.0 grams of 60° C. water), 5.0 grams "Aqualour 36B17" carbon black pigment (50% solids in water), and 10.0 grams of "XAMA-7" polyfunctional aziridine crosslinker. After coating this composition onto the aziridine-primed polyester film, sharp abrasive mineral as used in Example 5 was scattered by hand onto the wet coating in a generally uniform random manner to a weight of about 210 g/m². The composition was cured by drying for 5 minutes at 21° C., then for 1 minute at 85° C., then for 5 minutes while the temperature was increased from 85° C. to 102° C., and finally for 20 minutes at 102° C. A durable, flexible make coating that adhered well to the backing sheet and mineral was formed.

EXAMPLE 15

A coating composition was prepared as in Example 14 excepts as follows: no "Tinuvin 1130"UV absorber or "Tinuvin 123" UV scavenger was added; no "Aqualour 36B17" carbon black pigment was added; 7.5 grams of "Lo-Vel 275" ultrafine amorphous silica was added and dispersed well; to 50 grams of this composition were added 60 grams of "Excite 2330LBY" phosphorescent pigment and the whole composition was mixed for about 1 minute to achieve uniform dispersion of the pigment into the coating composition. After coating this composition onto the aziridine-primed polyester film, the coated sample was allowed to stand at room temperature (about 22° C.) for 5 minutes. It was then placed in an oven and heated for 1 minute at 74° C. The temperature of the oven was then increased from 74° C. to 102° C. over about 5 minutes, and maintained for 20 minutes at 102° C. for further curing of the composition. A durable, flexible make coating that adhered well to the backing sheet was formed.

EXAMPLES 16–24

For each of Examples 16–24, coating compositions were prepared from 475 grams of "NeoPac R-9699" water-based urethane/acrylic copolymer (40% solids in water), 25 grams of "NeoPac 9621" aliphatic polyester urethane adhesion promoter (38% solids in water), 10.0 grams of "Pycal 94" plasticizer, 10.0 grams of "Silwet L-7210" nonionic surfactant solution ("Silwet L-7210" surfactant as purchased diluted to 50% in water), 8.5 grams of "DSX-1514" polyurethane thickener dispersion (prepared by premixing 1.5 grams of "DSX-1514" thickener as purchased and 7.0 grams of 60° C. water), 7.5 grams of "Lo-Vel 275" ultrafine amorphous silica, 5.0 grams "Aqualour 36B17" carbon black pigment ("Aqualour 36B17" carbon black as purchased diluted to 50% solids in water), 1.0 gram of "Surfynol 104PA" nonionic surfactant, and 10.0 grams of "XAMA-7" polyfunctional aziridine crosslinker.

Film substrates were knife-coated with this coating composition with the knife gap set at about 0.30 mm resulting in wet film thicknesses of about 0.25–0.38 mm. Once coated on the backing sheet of interest (see below), the composition was cured by drying the constructions for 1–12 minutes at 21° C., then for 1–2 minutes at 74° C., then for 2–6 minutes while the temperature was increased from 74° C. to 102° C., and finally for 15–30 minutes at 102° C. In each example, durable, flexible coatings that adhered well to the backing sheet were formed.

The following backing sheets were coated with the composition described above to the listed thickness: Example 16, polyethylene terephthalate (PET) film treated with a 500 watt corona discharge in air as is known in the art; Example 17, PET film treated with an aqueous aziridine priming agent as described above; Example 18, polyvinyl chloride (PVC) film; Example 19, PET film treated with a reducing flame as described in U.S. Pat. No. 3,431,135, Example 5, except that the fuel was natural gas instead of propane, the burner-to-film distance was 5 mm, and the film transport speed across the flame was 80 meters/minute; Example 20, a structured polymeric release (nonadherent) surface such as that available under the trade designation "Ultracast Madagascar" from SD Warren Co., Boston, Mass.; Example 21, aluminum foil treated on one side with "S313" surface treatment, available from ALCOA, Chemicals Division, Pittsburgh, Pa. (the treated side was coated with the composition described above); Example 22, aluminum foil from Example 21, except the untreated side was coated with the composition described above after wiping with a paper towel to smooth the surface; Example 23, 0.025 mm "Saran Wrap" polyvinylidene chloride film (Dow Chemical Co., Midland, Mich.); Example 24, 0.075 mm "Melinex" Type 454 PET film (ICI Americas, Inc.) having a polyacrylic acid copolymer prime coating.

EXAMPLE 25

This example demonstrates the preparation of a nonwoven grinding wheel. A 15 mm thick low-density nonwoven web weighing 120 g/m² was formed from 38 mm staple length 13 denier nylon-6,6 fibers on a web forming machine available under the trade designation "Rando Webber" (Curlator Company, Rochester, N.Y.). The resulting low density web was roll-coated with a prebond resin containing 110 parts of a resole phenol formaldehyde liquid resin (a base catalyzed phenol formaldehyde resin with a phenol to formaldehyde ratio of 1:1.6 and an ultimate nonvolatile content of 70%), 15 parts of isopropyl alcohol, 3 parts of antifoaming agent available under the trade designation "Q2" from Dow Corning, Midland, Mich., and 1 part of a black colorant available under the trade designation "Aqualour 36B17" ("Aqualour 36 B17" carbon black as purchased diluted to 50% solids in water) to provide a dry add-on weight of 87 g/m². The prebond resin was cured to a nontacky condition by passing the coated nonwoven web through a convection oven maintained at 140° C. for a residence time of about 7 minutes. The resultant prebonded nonwoven web was about 12 mm thick and weighed about 207 g/m².

In order to make a nonwoven abrasive grinding wheel, rectangular pieces of the above prebonded nonwoven web, each piece measuring 229 mm×280 mm, were coated with an abrasive resin slurry containing 475 grams of "NeoPac R-9699" water-based urethane/acrylic copolymer (40% solids in water), 25 grams of "NeoPac R-9621" aliphatic polyester urethane adhesion promoter (38% solids in water), 10 grams of "Pycal 94" plasticizer, 10 grams of "Silwet L-7210" nonionic surfactant solution ("Silwet L-7210" surfactant as purchased diluted to 50% in water), 17 grams of "DSX-1514" polyurethane thickener dispersion (prepared by premixing 3 grams of "DSX-1514" thickener as purchased and 14 grams of 60° C. water), 7.5 grams of "Lo-Vel 275" ultrafine amorphous silica, 1.0 gram of "Surfynol 104PA" nonionic surfactant, 83 grams of 150 grit silicon carbide abrasive, 83 grams of 180 grit silicon carbide abrasive, and 10 grams of "XAMA-7" polyfunctional aziridine crosslinker. A conventional two roll coater equipped with hard rubber rolls was used to coat the slurry onto the web. The roller nip pressure was adjusted to enable a wet add-on of 2000 g/m² of the web. The resin coating and abrasive particles were observed to be uniformly distributed throughout the three dimensional matrix of the nonwoven prebond. The slurry-coated nonwoven was heated in an oven at 74° C. for a period of 3 minutes in order to partially evaporate the water in the coating, thereby increasing the viscosity of the coating and preventing the migration of the coating components during the subsequent process step.

A slab was prepared from twelve pieces of the uncured coated web which were stacked one upon the other and placed in a vacuum platen press preheated to 135° C., compressed to 25 mm Hg under vacuum and held under pressure for 45 minutes at the platen temperature while applying suction to the enclosed space in the platen. The cured slab was removed from the platen press, allowed to degas in a 135° C. oven at atmospheric pressure for 90 minutes, and finally allowed to cool to room temperature. A 25 mm thick abrasive wheel having an outer diameter of 203 mm and an arbor hole of 31.8 mm was die cut from the cured slab. The wheel had a measured density of 0.623 g/cm³.

The wheel was tested for performance by fixing the wheel onto a lathe, rotating the wheel at 2000 revolutions per minutes (rpm), and urging a preweighed 1018 steel coupon measuring 30 mm×100 mm against the radial edge of the wheel for 1 minute after which the weight loss from the metal coupon was determined. Five such 1 minute periods of testing were done before the lathe was stopped, the wheel removed and its weight loss determined. The cumulative weight loss of the test coupon was 0.35 grams; the weight loss from the wheel was 0.05 gram. The resulting efficiency index, the ratio of cut (coupon weight loss) to wear (wheel weight loss) was therefore determined to be 7.

EXAMPLE 26

This example demonstrates the preparation of a low density, nonwoven abrasive pad. A continuous three dimensionally undulated interengaged autogenously bonded web was formed according the disclosure in U.S. Pat. No. 4,227,350 (Fitzer) from nylon-6. The web was 10 mm thick with fiber diameter varying between 0.3 to 0.4 mm. Web weight was about 400 g/m². Pieces of this web measuring approximately 25 cm×25 cm were roll-coated to a wet add-on weight of 50 grams with a binder resin containing 475 grams of "NeoRez R-9699" water-based urethane/ acrylic copolymer (40% solids in water), 25 grams of "NeoPac R-9621" aliphatic polyester urethane adhesion promoter (38% solids in water), 10 grams of "Pycal 94" plasticizer, 10 grams of "Silwet L-7210" nonionic surfactant solution ("Silwet L-7210" surfactant as purchased diluted to 50% in water), 22.4 grams of "DSX-1514" polyurethane thickener dispersion (prepared by premixing 4.0 grams of "DSX-1514" thickener as purchased and 18.4 grams of 60° C. water), 7.5 grams of "Lo-Vel 275" ultrafine amorphous silica, 1.0 gram of "Surfynol 104PA" nonionic surfactant, 5 grams of "Aqualour 36B17" carbon black pigment ("Aqualour 36B17" carbon black as purchased diluted to 50% solids in water), and 10.0 grams of "XAMA-7" polyfunctional aziridine crosslinker. The coated web was allowed to stand for 5 minutes at room temperature and then sprayed with dry 60 grit aluminium oxide mineral from each side of the web such that the mineral add-on was about 25 grams total. The mineral was observed to be uniformly distributed throughout the matrix of the web filaments. The web was then cured at 108° C. for 30 minutes. The abrasive was firmly adhered to the cured resin, and the uniform black color of the web indicated that the binder resin was uniformly coated over the opaque white fibers.

Performance of the cured coated web was determined with a Schiefer Abrasion Testing Machine as described in American Society of Testing Methods D4158 (1982). The apparatus as shown in FIG. 2 of ASTM D4158-82 was modified by replacing the upper abradant support and the lower specimen support with flat stainless steel discs 4 inches in diameter (upper) and 5 inches in diameter (lower) and ³⁄₁₆ inch thick. The centers of rotation of the two supports are not colinear, being horizontally displaced by approximately 1 inch. The rotation of the two discs is in the same direction; the rotational speed of the two discs is approximately 250 rpm but is slightly different thus causing a grinding action between the two. Because the supports are horizontally offset, the pad overlaps the sample a little less than half way.

Discs measuring 100 mm diameter were die cut from the cured web and mounted onto the machine to test performance by abrading a standard hard acrylic plastic disc also mounted onto the machine. A preweighed disc was attached to the upper turntable of the machine via a "Dual-Lock" SJ3442 Type 170 tape available from the 3M Company, St. Paul, Minn. under the trade designation "Scotch-Mate". A preweighed 100 mm diameter poly(methylmethacrylate) disc 3.18 mm thick was attached to the bottom turntable of the machine using a double faced foam tape. The plastic disc is available under the trade designation "Acrylite" from American Cyanamid Company, Wayne, N.J., and has a Rockwell M Ball Hardness in the range of 90–105. Water was dripped on the acrylic disc at the rate of 40–60 drops per minute while grinding. The plastic disc was ground by lowering the upper turntable and initiating the revolution of both turntables. After 5000 revolutions the test was stopped and both the plastic disc and the nonwoven disc are weighed. The weight loss from both the sample and the workpiece were determined. The average weight loss from the acrylic test disc over 5 test runs was 0.77 gram. The average weight loss from the samples of nonwoven abrasive web over the same tests was 0.46 gram.

EXAMPLE 27

This example demonstrates a macro-textured antislip coating. A coating composition was prepared from 12.35 kg of "NeoPac R-9699" water-based urethane/acrylic copolymer (40% solids in water), 0.65 kg of "NeoPac R-9621" aliphatic polyester urethane adhesion promoter (38% solids in water), 260 grams of "Pycal 94" plasticizer, 260 grams of "Silwet L-7210" nonionic surfactant solution ("Silwet L-7210" surfactant as purchased diluted to 50% in water), 78 grams of "Triton GR-7M" anionic surfactant, 131 grams of "DSX-1514" polyurethane thickener dispersion (prepared by premixing 23 grams of "DSX-1514" thickener as purchased and 108 grams of 60° C. water), 130 grams "Aqualour 36B17" carbon black pigment ("Aqualour 36B17" carbon black as purchased diluted to 50% solids in water), and 260 grams of "XAMA-7" polyfunctional aziridine crosslinker.

Using the tool described in U.S. Pat. No. 5,435,816 (Spurgeon et al.), a macro-textured polyethylene/ polypropylene film to which the coating composition of the present invention does not adhere, was knife-coated with this composition to a wet thickness of about 43 mm, followed by drying for 2–6 minutes at 66° C. and then at 10–20 minutes at 85° C. A laminated adhesive (i.e., a pressure sensitive adhesive layer laminated on a release liner) available under the trade designation "Scotch 468" from the 3M Company, St. Paul, Minn., was laminated to this embossed coating. This construction of the coating of the present invention with a layer of adhesive and a release liner was then removed from the macro-textured film and ready for application to a substrate.

EXAMPLES 28–29

A coating composition was prepared from 12.35 kg of "NeoPac R-9699" water-based urethane/acrylic copolymer (40% solids in water), 0.65 kg of "NeoPac R-9621" aliphatic polyester urethane adhesion promoter (38% solids in water), 260 grams of "Pycal 94" plasticizer, 260 grams of "Silwet L-7210" nonionic surfactant solution ("Silwet L-7210" surfactant as purchased diluted to 50% in water), 78 grams of "Triton GR-7M" anionic surfactant, 131 grams of "DSX-1514" polyurethane thickener dispersion (prepared by premixing 23 grams of "DSX-1514" thickener as purchased and 108 grams of 60° C. water), 130 grams "Aqualour 36B17" carbon black pigment ("Aqualour 36B17" carbon black as purchased diluted to 50% solids in water), and 260 grams of "XAMA-7" polyfunctional aziridine crosslinker. Prior to application of the coating composition, 120 grams of this composition was mixed with 18 grams of 500 grit silicon carbide (Example 28) or 12 grams of 220 grit alum A (fused aluminum oxide mineral) (Example 29).

Each of these compositions was knife-coated on the macro-textured film to increase the antislip properties as described in Example 27 to a wet thickness of about 38 mm, followed by drying for 2–6 minutes at 66° C. and then at 10–20 minutes at 85° C. The laminated pressure sensitive adhesive described in Example 27 was laminated to this embossed coatings. These constructions of the coating of the present invention with a layer of adhesive and a release liner were then removed from the macro-textured film and ready for application to a substrate.

EXAMPLE 30

A coating composition was prepared from 475 grams of "NeoPac R-9699" water-based urethane/acrylic copolymer (40% solids in water), 25 grams of "NeoPac R-9621" aliphatic polyester urethane adhesion promoter (38% solids in water), 10.0 grams of "Pycal 94" plasticizer, 10.0 grams of "Silwet L-7210" nonionic surfactant ("Silwet L-7210"

surfactant as purchased diluted to 50% in water), 3.0 grams of "Triton GR-7M" anionic surfactant, 5.7 grams of "DSX-1514" polyurethane thickener dispersion (prepared by premixing 1.0 gram of "DSX-1514" thickener as purchased and 4.7 grams of 60° C. water), and 10.0 grams "Aqualour 36B17" carbon black pigment ("Aqualour 36B17" carbon black as purchased diluted to 50% solids in water). After this mixture had been mixed for 1 hour, the following components were added to 30 grams of this composition: 30 grams of "NeoCryl A-633" acrylic emulsion adhesion promoter (42% solids in water), 0.6 gram of "Pycal 94" plasticizer, and 1.2 grams of "XAMA-7" polyfunctional aziridine crosslinker. This composition was coated onto vinyl floor tiles (Kentile Floors, Inc., South Plainfield, N.J.) and aluminum plates, and allowed to air dry. A durable, flexible coating that adhered well to the substrate was formed.

EXAMPLES 31 and 32

A make coating composition was prepared from 12350 grams of "NeoPac R-9699" water-based urethane/acrylic copolymer (40% solids in water), 650 grams of "NeoPac R-9621" aliphatic polyester urethane adhesion promote (38% solids in water), a premixed mixture consisting of 260 grams of "Pycal 94" plasticizer, 52 grams of "Tinuvin 1130" UV absorber, and 26 grams of "Tinuvin 123" UV scavenger, 260 grams of "Silwet L-7210" nonionic surfactant solution ("Silwet L-7210" surfactant as purchased diluted to 50% in water), 78 grams of "Triton GR-7M" anionic surfactant, 390 grams of "Aqualour 36B17" carbon black pigment, 222 grams of a mixture consisting of 39 grams of "DSX-1514" thickener and 183 grams of water, and 260 grams of "XAMA-7" polyfunctional aziridine crosslinker. The composition of Example 32 also included 714 grams of a filler available under the trade designation "Pumice 4F" from Harcros Chemicals, Inc., Kansas City, Kans. This make coating composition was coated onto aziridine-primed polyester film at a wet thickness of about 0.18 mm after which sharp mineral) was dropped uniformly onto the wet coating at a rate of about 192 g/m². The coated film was allowed to remain at room temperature for about 5 minutes, was heated at 85° C. in an oven for about 1 minute at which time the oven temperature was raised to about 102° C. over about a 3 minute interval, and finally the film was cured at about 102° C. for 15 minutes. The coated, cured film was then size-coated with a coating composition essentially identical to the make coating except that 260 grams of "Aqualour 36B17", 74 grams of "DSX-1514" mixture, and 390 grams of "Lo-Vel 27" silica were added to the composition. The size coating composition was coated onto the cured make coated, mineral containing film at a rate of about 54 g/m². Heating and curing were as described for the make-coating. Methods and Results

Gardner Impact Test

A Gardner Impact Tester (Pacific Scientific Company, Bethesda, Md.) equipped with a 0.45 kg impactor was used to determine impact resistance of the samples. Impact resistance samples were prepared by adhering a 70 mm×80 mm piece of the coated material to an essentially flat sheet of steel using a contact adhesive. The type of adhesive is not important as long as the sample is held in place. The adhesive strength or other adhesive properties are not being tested. The impactor was dropped onto sample from heights of 45.7 cm, 63.5 cm, and 102 cm. Impacted sample was inspected for delamination of the coating from the backing sheet, cracking or other deleterious changes in the coating.

The coating "passed" this test if there was no cracking and/or no delamination from the backing sheet. The cured coatings of Examples 10, 11, and 17 were evaluated using this test and all passed.

Solvent Resistance Test

Samples (2.5 cm×7.5 cm) were immersed in each of the following liquids for seven days at room temperature: tap water; isopropanol; mineral spirits; "Chlorox" household bleach: methyl ethyl ketone; 30 weight motor oil; "Skydrol 500 B4" hydraulic fluid (Monsanto Company, St. Louis, Mo.); "Prestone" anti-freeze (First Brands Corporation, Danbury, Conn.) mixed 1:1 with water; "Ivory Snow" detergent (1% dissolved in water); 1% hydrochloric acid; 3M Brand Food Service Degreaser (3M Company, St. Paul, Minn.). The sample "failed" the test if it: delaminated from the backing sheet; became hazy or showed a visible color change; demonstrated a loss of integrity or strength; was damaged in any other manner; or for mineral-coated samples, if mineral loss exceeded 5% by weight. The cured coatings of Examples 1, 5–12, 17, and 31 were evaluated using this test and all passed.

Tape Adhesion Test

A 102 mm×102 mm coated sample was adhered to a painted steel panel using a contact adhesive to bond the uncoated side of the coated sample to the panel. The type of adhesive is not important as long as the sample is held in place. The adhesive strength or other adhesive properties are not being tested. A crosshatch scribe pattern consisting of cuts approximately 3 mm apart was made in the coating with a razor blade. A length of tape available under the trade designation "Scotch 610" from the 3M Company, St. Paul, Minn., was applied to the scribed area, pressed down and quickly removed. The amount of coating removed by the tape was observed visually. The sample passed if there was substantially no transfer (i.e., less than about 5% by surface area) of the coating to the tape. The coatings of Examples 10 (make coating only), 11 (make coating only), and 17 passed this test.

Tuber Abrasion Resistance Tests

A standard Taber Abrasion test was performed suing a "Taber Abraser" (Model 174 manufactured by the Taber Instrument Corporation, Tonawanda, N.Y.) and H-18 Taber abrading wheels with a 500 gram load per wheel. The test was run for 500 cycles with vacuum on. Test samples were then removed and weight loss determined. The cured coating of Example 17 exhibited a weight loss of less than 200 mg.

Slip-Resistance Tests

The coefficient of friction of the prepared samples against leather and rubber were determined, respectively. The leather was oak-tanned sole leather that had been sanded smooth with 30 grit silicon carbide cloth. The rubber was a vulcanized compound with a hardness range of 60–80 Shore A durometer. Tests were made with either the contact surfaces dry, wet with water, or oiled using SAE 10W oil at a temperature of about 16°–27° C. The leather and rubber were cut to into 5 cm×10 cm samples and mounted on a block of the same size. There was a separate block for each test condition. A load of 15 kg of steel was placed uniformly over a 10 cm×18 cm block during the test. A tensile testing machine was used to measure the force required to move the weight block on the coated sample. The moving jaw of the tensile testing machine was set to move at the rate of 51 cm/minute. The leather on the block for the wet test was presoaked in water; for the wet tests, water was supplied via a small stream or spray to provide water on the path of the test blocks. For the oil tests, the oil was applied to the test surfaces of the leather or rubber sample and on the surface of the sample being tested to spread evenly along the path of the test block. A sample "passed" this test if the static coefficient of friction and dynamic coefficient of friction is greater than about 0.5. The cured coating of Examples 7–11 and 31 were evaluated using this test and all passed.

Flexibility Tests

A Folding Endurance Tester available from Tinius Olsen Testing Machine Co., Willow Grove, Pa., was used to determine the flex fatigue resistance of the samples. Samples were cut to 12.7 cm×1.27 cm and were flexed 4500 cycles (2700 per cycle; 180 cycles per minute) with a 0.91 kg load. A sample passed if there was no delamination of the coating from the backing sheet, less than about 5% mineral loss for samples with mineral coated thereon, or no cracking of the coating or delamination from the backing sheet. The cured coating of Example 10 was evaluated using this test and it passed.

Tensile Strength Tests

Free-standing coating of the inventive coating was prepared by coating the make coat solution of Example 10 on 2.5 cm×15.2 cm strips of untreated PET film. The coating does not adhere well to untreated PET. Thus, after curing, the coating could be gently peeled off the PET film to provide a free-standing coating for tensile testing. A standard Instron Tensile Tester, equipped with a jaw separation of 11.4 cm and set to run at a crosshead speed of 30.5 cm/minute, was used for tensile testing. Prior to testing, the thickness of each sample was determined with a micrometer. Tensile strength and elongation at the point of break were recorded. The tensile strength and elongation of the cured coating of Example 10 (make coating) were 28.3 Mpa and 112% respectively.

The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The disclosures of all patents, patent applications, and documents are incorporated herein by reference.

What is claimed:

1. A curable water-based coating composition comprising:
   (a) a urethane/acrylic copolymer having a Tg of greater than about 50° C.;
   (b) a polyoxyethylene aryl ether plasticizer;
   (c) an alkaline-stable crosslinker; and
   (d) water;
   wherein the curable water-based coating composition includes less than about 5 wt-% volatile organic compounds, based on the total weight of the composition.

2. The curable water-based coating composition of claim 1 wherein the polyoxyethylene aryl ether plasticizer is present in an amount of about 1–10 wt-% based on the weight of polymer solids.

3. The curable water-based coating composition of claim 1 further including an adhesion promoter.

4. The curable water-based coating composition of claim 3 wherein the adhesion promoter is an acrylic copolymer in a amount of about 25–145 wt-%, based on the weight of the urethane/acrylic copolymer solids.

5. The curable water-based coating composition of claim 1 further including an associative thickener.

6. The curable water-based coating composition of claim 5 wherein the associative thickener comprises a polyurethane.

7. The curable water-based coating composition of claim 1 further including a surfactant.

8. The curable water-based coating composition of claim 1 wherein the alkaline-stable crosslinker is a polyfunctional aziridine compound.

9. The curable water-based coating composition of claim 8 wherein the polyfunctional aziridine compound is selected from the group consisting of trimethylolpropane-tris-($\beta$-(N-aziridinyl)propionate and pentaerythritol-tris-($\beta$-(N-aziridinyl)propionate.

10. The curable water-based coating composition of claim 1 wherein the polyoxyethylene aryl ether plasticizer is a compound of the formula HO—(—$CH_2$—$CH_2$—O—)$_x$—$C_6H_5$ wherein x=4–10.

11. The curable water-based coating composition of claim 10 wherein x=4–6.

12. The curable water-based coating composition of claim 10 wherein x=4.

13. A cured coating prepared from the curable water-based coating composition of claim 1.

14. The cured coating of claim 13 which is a free-standing coating with a layer of pressure sensitive adhesive coated on one surface of the coating.

15. The cured coating of claim 14 further including frictional particles.

16. The cured coating of claim 14 wherein the surface of the cured coating comprises an embossed surface.

17. A curable water-based coating composition comprising:
   (a) a urethane/acrylic copolymer having a Tg of greater than about 50° C.;
   (b) a polyoxyethylene aryl ether plasticizer;
   (c) a polyfunctional aziridine crosslinker;
   (d) an associative thickener;
   (e) a surfactant; and
   (f) water;
   wherein the curable water-based coating composition includes less than about 5 wt-% volatile organic compounds, based on the total weight of the composition.

18. The curable water-based coating composition of claim 17 wherein the polyoxyethylene aryl ether plasticizer is present in an amount of about 1–10 wt-% based on the weight of polymer solids.

19. The curable water-based coating composition of claim 18 wherein the polyfunctional aziridine crosslinker is present in an amount of about 2–8 wt-%, based on polymer solids.

20. The curable water-based coating composition of claim 18 wherein the polyoxyethylene aryl ether plasticizer is a compound of the formula HO—(—$CH_2$—$CH_2$—O—)$_x$—$C_6H_5$ wherein x=4–10.

21. The curable water-based coating composition of claim 20 wherein x=4.

22. The curable water-based coating composition of claim 17 further including an adhesion promoter.

23. The curable water-based coating composition of claim 22 wherein the adhesion promoter is an acrylic copolymer.

* * * * *